United States Patent
Johnson

(10) Patent No.: US 10,327,604 B2
(45) Date of Patent: Jun. 25, 2019

(54) DRY URINAL APPARATUS

(71) Applicant: Eidon, LLC, Mercer Island, WA (US)

(72) Inventor: Roger N. Johnson, Mercer Island, WA (US)

(73) Assignee: Eidon, LLC, Mercer Island, WA (US)

( * ) Notice: Subject to any disclaimer, the term of this patent is extended or adjusted under 35 U.S.C. 154(b) by 90 days.

(21) Appl. No.: 15/288,890

(22) Filed: Oct. 7, 2016

(65) Prior Publication Data

US 2017/0100004 A1 Apr. 13, 2017

Related U.S. Application Data

(60) Provisional application No. 62/284,867, filed on Oct. 13, 2015.

(51) Int. Cl.
*A47K 11/12* (2006.01)
*C05C 9/00* (2006.01)

(52) U.S. Cl.
CPC ............... *A47K 11/12* (2013.01); *C05C 9/00* (2013.01); *Y10T 137/2842* (2015.04); *Y10T 137/2849* (2015.04)

(58) Field of Classification Search
CPC .............. A47K 11/12; Y10T 137/2842; Y10T 137/2849; Y10T 137/287; Y10T 137/2924; Y10T 137/2774; Y10T 137/2815; Y10T 137/2822; Y10T 137/2733; Y10T 137/274; Y10T 137/2747; F04F 10/00; F04F 10/02; E03D 1/165; A01G 27/00; A01G 27/005; A01G 27/006; C05C 9/00

USPC ............ 4/144.1, 225.1, 227.1, 227.4, 227.5, 4/227.7; 137/128, 142–146; 239/68
See application file for complete search history.

(56) References Cited

U.S. PATENT DOCUMENTS

| | | | | |
|---|---|---|---|---|
| 449,083 A | * | 3/1891 | Miller | F04F 10/00 137/128 |
| 557,560 A | * | 4/1896 | De La Hunt | E03F 9/007 137/138 |
| 1,037,791 A | * | 9/1912 | Miller | B60K 15/061 137/138 |
| 1,274,578 A | * | 8/1918 | Nicholson | F04F 10/00 137/128 |
| 3,339,801 A | * | 9/1967 | Hronas | E03D 9/033 137/126 |
| 3,856,205 A | * | 12/1974 | Rohling | A01G 27/006 137/78.3 |

(Continued)

FOREIGN PATENT DOCUMENTS

| | | | | |
|---|---|---|---|---|
| DE | 1609233 A1 | * | 2/1972 | E01B 13/00 |
| DE | 2816597 B1 | * | 9/1979 | E03C 1/281 |

*Primary Examiner* — Erin Deery
(74) *Attorney, Agent, or Firm* — Dorsey & Whitney LLP

(57) ABSTRACT

A dry urinal apparatus, comprising a receptacle configured to store urine, the urine having a layer of oil on its surface and a siphon assembly disposed within the receptacle and coupled to a reservoir. The siphon assembly includes a siphon tube and drain tube, the siphon tube operable to force urine down the drain tube, wherein the reservoir is configured to cease operation of the siphon assembly prior to the siphon tube pulling up the layer of oil with the urine. The reservoir is configured to cease operation of the siphon assembly in response to a distance required to pull air bubbles up the reservoir and into the drain tube being less than a distance required to raise urine into the drain tube.

9 Claims, 2 Drawing Sheets

(56) References Cited

U.S. PATENT DOCUMENTS

| | | | | |
|---|---|---|---|---|
| 5,711,037 A * | 1/1998 | Reichardt | ............... | E03C 1/281 |
| | | | | 4/144.1 |
| 5,850,972 A * | 12/1998 | Campau | ............... | A01G 27/001 |
| | | | | 222/187 |
| 6,053,197 A * | 4/2000 | Gorges | ................... | E03C 1/281 |
| | | | | 137/247.39 |
| 6,178,984 B1 * | 1/2001 | Amsellem | ............ | A01G 27/005 |
| | | | | 137/128 |
| 6,286,153 B1 * | 9/2001 | Keller | ..................... | E03C 1/281 |
| | | | | 4/144.1 |
| 6,425,411 B1 * | 7/2002 | Gorges | ..................... | E03C 1/28 |
| | | | | 137/247.39 |
| 8,904,570 B2 * | 12/2014 | Brooks | .................. | A47K 11/12 |
| | | | | 4/144.1 |
| 9,295,204 B2 * | 3/2016 | Nguyen | ............... | A01G 27/005 |
| 9,790,672 B2 * | 10/2017 | McAlpine | ............... | E03C 1/232 |
| 9,894,854 B2 * | 2/2018 | Nguyen | ............... | A01G 27/005 |
| 2004/0148856 A1 * | 8/2004 | Sawyer | ................ | A01G 27/005 |
| | | | | 47/81 |

\* cited by examiner

DRY URINAL APPARATUS

CROSS-REFERENCE TO RELATED APPLICATION

This application claims the benefit of U.S. Provisional Application No. 62/284,867, filed Oct. 13, 2015 entitled "DRY URINAL APPARATUS," which is incorporated herein by reference in its entirety.

SUMMARY

According to one aspect, a dry urinal apparatus comprises a receptacle configured to store urine, the urine having a layer of oil on its surface and a siphon assembly disposed within the receptacle and coupled to a reservoir. The siphon assembly includes a siphon tube and drain tube, the siphon tube operable to force urine down the drain tube, wherein the reservoir is configured to cease operation of the siphon assembly prior to the siphon tube pulling up the layer of oil with the urine. The reservoir is configured to cease operation of the siphon assembly in response to a distance required to pull air bubbles up the reservoir and into the drain tube being less than a distance required to raise urine into the drain tube.

BRIEF DESCRIPTION OF THE DRAWINGS

Reference will now be made to the attached drawings, when read in combination with the following specification, wherein like reference numerals refer to like parts throughout the several views, and in which.

DETAILED DESCRIPTION

Figure 1:
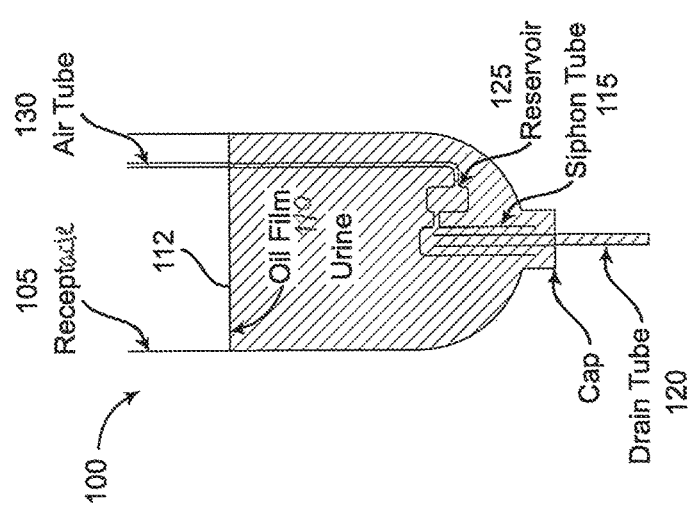
FIGS. 1-4 are a schematic illustration of a progression of siphoning fluid via a dry urinal apparatus, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Urinals are designed to capture liquid waste. In most cases urinals use the same plumbing waste lines and sewer connections as the solid waste toilets and end up mixing the waste streams. Though waterless urinals nearly eliminate water use its use of vented plumbing, required for toilets, cause many downstream problems due to crystal formation of salts in the pipes. Urine accounts for 70% of the human waste volume and 55% of the desiccated solids leaving the human body. Converting this waste into a resource reduces the costs of other toilet wastes while maintaining the significant fertilizer value of urine properly protected from air. In addition, the polluted waste stream of fecal waste is not enlarged unnecessarily. This dry urinal apparatus is a design appropriate for the developing world in its material, manufacturing, and operational use. The dry urinal apparatus provides a means to maintain a film of oil over the urine that prevents smell and prevents air from degrading the urine into ammonia. The urinal has a valve without moving parts that allows urine to siphon from the collection bowl into a non-vented waste tube while not siphoning the oil itself. The wet urine flow is carried into a series of "first in first out" storage containers designed to hold 10 days of urine accumulation. This is a long enough period for the urine to convert into a nutrient comparable to commercial fertilizers and to be drip irrigated onto a crop or lawn.

Most urinals simply capture urine and direct it into the same waste line as the toilet. Some use a bit of water to wash the bowl while some use none. The waterless ones employ a variety of traps to seal off the vented waste line in order to direct the gases and smells to the roof. This eliminates the water use, but sends a trickle of urine down sloped pipes ventilated with drying air. As a result the pipes eventually accumulate crystalized salts and plug. The primary design choice for urinals is to increase capacity of a toilet facility and to reduce water use. The urine is disposed of in the conventional sewer and still results in increased contaminate waste volume.

The dry urinal apparatus is configured to capture urine flow and protect it from the air until it is converted into a non-ammonia generating fertilizer delivered by drip irrigation to crops or lawn. The dry urinal may, for example, be made from cut off plastic 2 liter bottles attached to a waist high support. A siphon tube may be attached to a lid at the bottom of the bottle such that an inch or so of urine can accumulate before a siphon begins. A small amount of oil is floated on the urine so as to create a smell barrier that keeps the air from the collection. A valve assembly designed to allow the siphon to be stopped before the oil is lost is lowered over the siphon tube with a short length of tubing. This tubing is connected to a small reservoir that will pull air into the siphon area when its depth is less than the remaining fluid. This stops the siphon with a small bubble of air equal to about ¼" length of the ¼" tubing. This small amount of air is insignificant to the wet condition maintained in the drain tubing or to the urine breakdown into non ammonia producing fertilizer. The drain tube then carries the urine to a series of connected containers that separate new urine from older urine. Initially the tube enters a sealed lid and directs the urine to the bottom of the container. The top of the container then provides a tube that leads to the bottom of the next container and so on. Containers are connected until 10 days of normal flow is held. It is then directed with drip irrigation tubing to a garden plot or transfer container.

The dry urinal apparatus may, for example, be made from less than one dollar (USD) of common drip irrigation supplies and recycled containers. The valve may comprise ½ inch PVC tubing that is cut, flame heated, and then pinch sealed. Parts may be connected with ¼ inch barbed connectors and tubing. The drain tubbing may, for example, be ¼ inch so that it can be kept wet and because it is adequate for single person use of the urinal. Moreover, treatment and storage containers may be recycled bottles of about 4 liters each and interconnected via ¼ inch tubing.

Users of the dry urinal apparatus may direct the processed urine fertilizer directly to plants with standard drip irrigation techniques. Urinals can be connected to common storage processing tanks and include other sterile liquid waste. Because urine may include more salt than some plants can tolerate, added liquid may be helpful. In dry climates the dry urinal may repurpose human liquid waste for plant benefits.

FIGS. 1-4 show a schematic illustration of a progression of siphoning fluid via a dry urinal apparatus 100, according to one embodiment.

The dry urinal 100 comprises a receptacle 105 configured to hold fluid, such as for example, urine therein. A thin film of oil 110 may be encapsulating a top surface 112 of the urine so as to preserve it. The oil serves to insulate the urine from air or oxygen. The layer of oil protecting the urine from air may be any type of oil or oil-based substance known in the art, including for example, vegetable oil, motor oil, or the like.

It's advantageous to prevent urine from coming into contact with air to prevent the release of ammonia from the urine. Upon insulating the urine from air for a period of time, the urine will have nitrogen available and useful for plants and crops via drip irrigation, for example. Such preserved urine may be broken down into non-ammonia producing fertilizer. An additional benefit to preserving the urine is that, but-for the urine preservation, oxygen would convert the urine to salt crystals and likely plug drain pipes.

The receptacle 105 includes a siphon tube 115, a drain tube 120, and a reservoir 125 coupled to the siphon tube 115. The reservoir 125 is coupled to an air tube 130 which is opened to air. As urine fills the receptacle 105, the urine traverses up the siphon tube and down the drain tube to one or more containers 510 (to be described in more detail below). Once the urine rises above the actual height of the drain tube, the siphon tube begins to pull the urine up the siphon tube and down the drain tube. In other words, the siphoning process is initiated. At that point, the urine also fills the reservoir. As the urine flows up the siphon tube and then down the drain tube, the urine level within the receptacle is lowered (See e.g., FIG. 2). As will be discussed in more detail below, due to the reservoir, only the urine drains while the oil film remains floating at the top surface of the urine all the time.

Figures 2, 3:
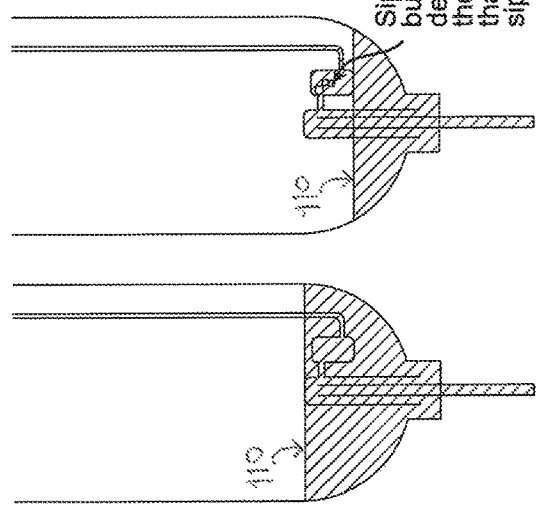

As illustrated in FIG. 3, the drain tube begins pulling urine stored in the reservoir as well as the urine within the siphon tube. The pressure in the siphon and drain tube are same everywhere while draining. The drain tube will drain till bubbles form. Anytime it's easier for the siphon to pull bubble than water, it will pull bubbles.

In particular, urine draining in the drain tube pulls urine up the siphon tube. The siphon tube will pull bubbles from the reservoir and plug the drain tube when it's easier for the siphon tube to pull bubbles from the reservoir. In other words, the siphon tube attempts to pull from wherever it can and always pulls the easiest substance. Difficulty in pulling air bubbles is based on the depth of the urine in the receptacle relative the urine level within the reservoir.

Figure 4:
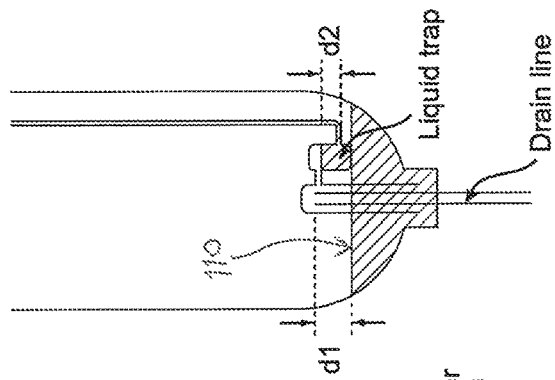

As illustrated in FIG. 4, when the pressure to pull bubbles from the reservoir into the drain tube is less than pressure to pull urine up the siphon tube, the reservoir air bubbles traverse down the siphon tube and plug it before the oil layer is siphoned up the siphon tube. This creates a wet line plug on the drain tube which prevents the urine from exposure to air and simultaneously prevents the oil layer from being siphoned into the siphon tube.

In one example, the siphoning process may cease in response to a distance d2 required to pull reservoir bubbles up the reservoir and into the drain tube being less than a distance d1 required to raise urine up and into the drain tube. Once d1>d2, bubbles are pulled by the siphon tube and the siphoning process is stopped, thereby preserving the urine and saving the oil layer on its surface. In other words, once the few bubbles from the reservoir enter the siphon tube, it stops the siphon process while urine is still present in the drain tube and without any oil mixed in.

As mentioned above, in response to urine rising above an actual height of the drain tube, the siphoning process is initiated. Absent the reservoir, the oil would be siphoned together with the water and thus oil would be lost all the time. Consequently, the reservoir prevents the siphoning of the oil layer on top.

It should also be noted that absent the reservoir, urine would be still siphoned when its level drops just below a cap of the receptacle. As such, the urine and the oil surface would be sucked up into the siphon tube and then below the receptacle cap. This would introduce a substantial amount of air into the drain tube and effectively open the drain tube to oxygen. The problem would be that air would enter the siphon tube and dry up the urine and create salt crystals in dry urinal apparatus. The reservoir eliminates this problem. The reservoir is advantageous in that only a few small air bubbles enter the drain tube to stop the siphoning process. The few bubbles from the reservoir effectively induce a water plug because air does not have a chance to traverse the entire drain tube. Consequently, absent the reservoir, it would be plugged with air inside as opposed to water and then dry out.

Figure 5:
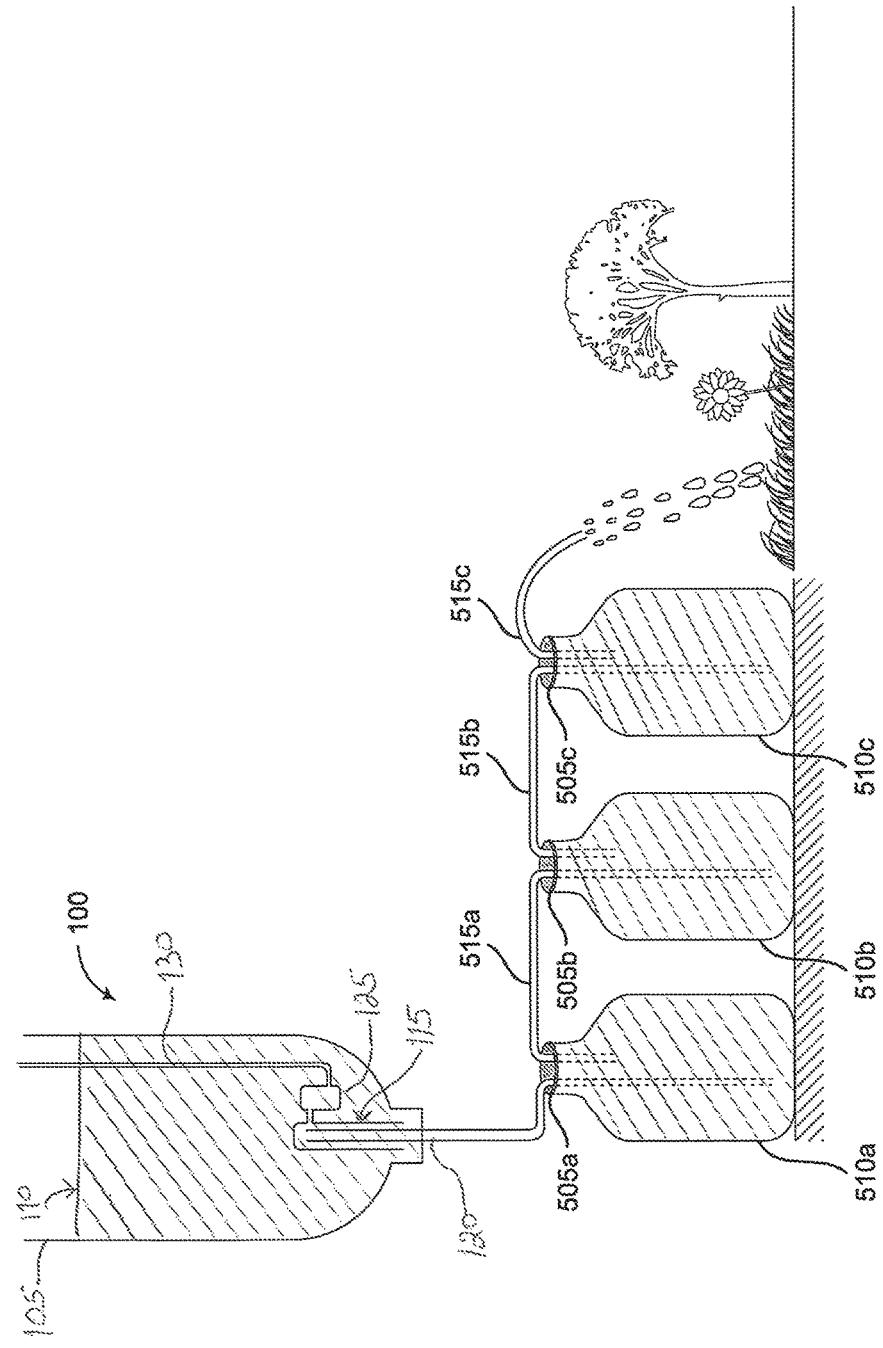
FIG. 5 is the dry urinal apparatus coupled to one or more containers configured to store and preserve urine till it can be used as fertilizer for agriculture (e.g., irrigation), according to one embodiment.

FIG. 5 shows the dry urinal apparatus coupled to one or more containers 510a, 510b, 510c (collectively referenced herein as 510) configured to store and preserve urine till it can be used as fertilizer for agriculture (e.g., irrigation), according to one embodiment.

Urine siphoned down the drain tube (as illustrated in FIGS. 1-4) is collected in a first container 510a that has a sealed lid 505a thereon. Similarly to the oil layer in the receptacle, the sealed lid 505a is configured to preserve the urine to prevent contamination with air. As additional urine is siphoned down the drain tube, it displaces the first container old urine along container tube 515a. In other words, the additional urine flows to a bottom of the first container 510a while previous or old urine is siphoned out from a top of the first container 510a and along the first container tube 515a.

The previous urine is subsequently siphoned via the container tube 515a to a bottom portion of a second container 510b, where a similar siphoning process takes place (e.g., top of the second container has a second container tube 515b that leads to a bottom of the third container 510c). This re-siphoning of accumulated urine may continue several rounds through several containers. For example, as new urine enters the container 510, the old urine is siphoned out through the top of the container 510 and into the bottom portion of the subsequent container 510. In one embodiment, the containers 510 are configured to implement a FIFO (first-in first-out) system. Although three containers 510 are illustrated, it will be understood by those skilled in the art that any number of containers may be used. The number of containers used depends on the amount of fresh urine flow down the siphon tube. The greater the quantity and frequency of fresh urine being introduced the greater the number of containers required to store and resiphon the urine. The resiphoning of urine may continue for 10 days or until the originally siphoned urine can be used for agriculture, whichever is sooner.

It will be appreciated by those of ordinary skill in the art that although reference throughout this application has been made to urine, the siphon process may be implemented using any liquid. Additionally, the oil-based preservation layer may be replaced by any other preservation layer known in the art. Finally, the dry urinal may be manufactured by any known technique and using any material.

While the particular methods, devices and systems described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

It will be appreciated that modifications and variations of the invention are covered by the above teachings and within the purview of the appended claims without departing from the spirit and intended scope of the invention.

The invention claimed is:

1. A dry urinal apparatus, comprising:
   a receptacle having an opening which receives urine and a layer of oil on a top surface of the urine, the receptacle includes a cap opposite the opening;
   a drain tube positioned through the cap of the receptacle, the drain tube including an upper portion positioned within the receptacle and a lower portion external to the receptacle;
   a siphon tube positioned within the receptacle and partially encapsulates the upper portion of the drain tube while exposing the cap to the urine, wherein the urine draining down the drain tube pulls the urine from the receptacle up the siphon tube; and
   a reservoir having a first opening coupled to the siphon tube and a second opening exposed to air, the first and second openings arranged such that the urine draining down the drain tube ceases responsive to a distance to pull the air from the second opening and into the drain tube via the first opening being less than a distance to raise the urine within the siphon tube up and into the drain tube.

2. The dry urinal apparatus of claim 1 wherein the first and second openings of the reservoir are positioned such that, responsive to the urine draining down the drain tube, the air is pulled into the siphon tube and plugs the drain tube prior to the oil of the top surface of the urine being siphoned up the siphon tube.

3. The dry urinal apparatus of claim 1 wherein the drain tube comprises the urine without the layer of oil responsive to the urine draining down the drain tube pulling the air from the reservoir into the siphon tube to cease the flow of the urine down the drain tube.

4. The dry urinal of claim 3, wherein the drain tube comprises the urine along with the air introduced into the siphon tube from the reservoir, wherein the air remains within a portion of the drain tube encapsulated by the siphon tube.

5. The dry urinal of claim 1, further comprising first and second containers to store the urine siphoned through the drain tube, wherein the first container is coupled to the lower portion of the drain tube.

6. The dry urinal of claim 5, wherein each of the first and second containers are sealed to prevent urine exposure to air.

7. The dry urinal of claim 6, wherein the second container is coupled to the first container via a first container tube to siphon the urine from a top portion of the first container into a bottom portion of the second container.

8. The dry urinal of claim 7, wherein a second container tube is coupled to a top portion of the second container to siphon the urine from the second container for irrigation.

9. The dry urinal of claim 7, wherein a second container tube is coupled to a top portion of the second container to siphon the urine from the top portion of the second container to a third container.

* * * * *